United States Patent

Walton

Patent Number: 6,145,042
Date of Patent: Nov. 7, 2000

[54] TIMING PROTOCOL FOR A DATA STORAGE SYSTEM

[75] Inventor: John K. Walton, Mendon, Mass.

[73] Assignee: EMC Corporation, Hopkinton, Mass.

[21] Appl. No.: 08/996,809

[22] Filed: Dec. 23, 1997

[51] Int. Cl.⁷ .................................................. G06F 12/00
[52] U.S. Cl. ........................ 710/112; 710/107; 710/119; 710/120; 711/150; 711/151; 711/148; 711/167
[58] Field of Search ..................................... 711/100, 104, 711/167, 113, 114, 168, 150, 151, 148; 395/280, 287, 309; 710/112, 119, 120, 107

[56] References Cited

U.S. PATENT DOCUMENTS

| | | | |
|---|---|---|---|
| 4,873,626 | 10/1989 | Gifford | 364/200 |
| 5,809,340 | 9/1998 | Bertone et al. | 711/167 |
| 5,822,777 | 10/1998 | Leshem et al. | 711/167 |
| 5,842,005 | 11/1998 | Walsh et al. | 713/500 |
| 5,850,528 | 12/1998 | Walton et al. | 395/287 |
| 5,875,343 | 2/1999 | Binford et al. | 710/39 |

*Primary Examiner*—John W. Cabeca
*Assistant Examiner*—Pierre M. Vital
*Attorney, Agent, or Firm*—Fish & Richardson P.C.

[57] ABSTRACT

A data storage system wherein a main frame computer section having main frame processors for processing data is coupled to a bank of disk drives through an interface. The interface includes a bus having: an bus-select/address/command portion; bus-grant/data/clock-pulse portion; a bus queue portion; and an ending-status portion. A plurality of addressable memories is coupled to the bus. A plurality of controllers is coupled to the bus. Each one thereof being adapted: to assert on the bus-select/command/address portion of the bus, during a controller initiated bus select assert interval, a command. The addressed memory is adapted to produce on the queue portion of the bus a queue signal a predetermined time after a controller initiated bus select assert interval. The queue signal terminates the bus select interval. Another one of the controllers is adapted to provide on the bus-select/address/command portion of the bus another address and command after the queue signal terminates the bus select assert interval. The memory is adapted to write, in response to the write operation request by the controller during the bus grant interval, the data on the bus-grant/data/clock-pulse portion of the bus into the addressed memory in response the bus write clock pulses produced by the controller on the bus-grant/data/clock-pulse portion of the bus. The memory is adapted to remove the bus grant signal upon completion of the write operation requested by the controller terminating the bus grant interval and to produce an ending-status signal and ending-status data on the ending-status bus upon the addressed memory's completion of the write operation requested by the controller.

6 Claims, 10 Drawing Sheets

| FIG. 1A | FIG. 1B | FIG. 1C |

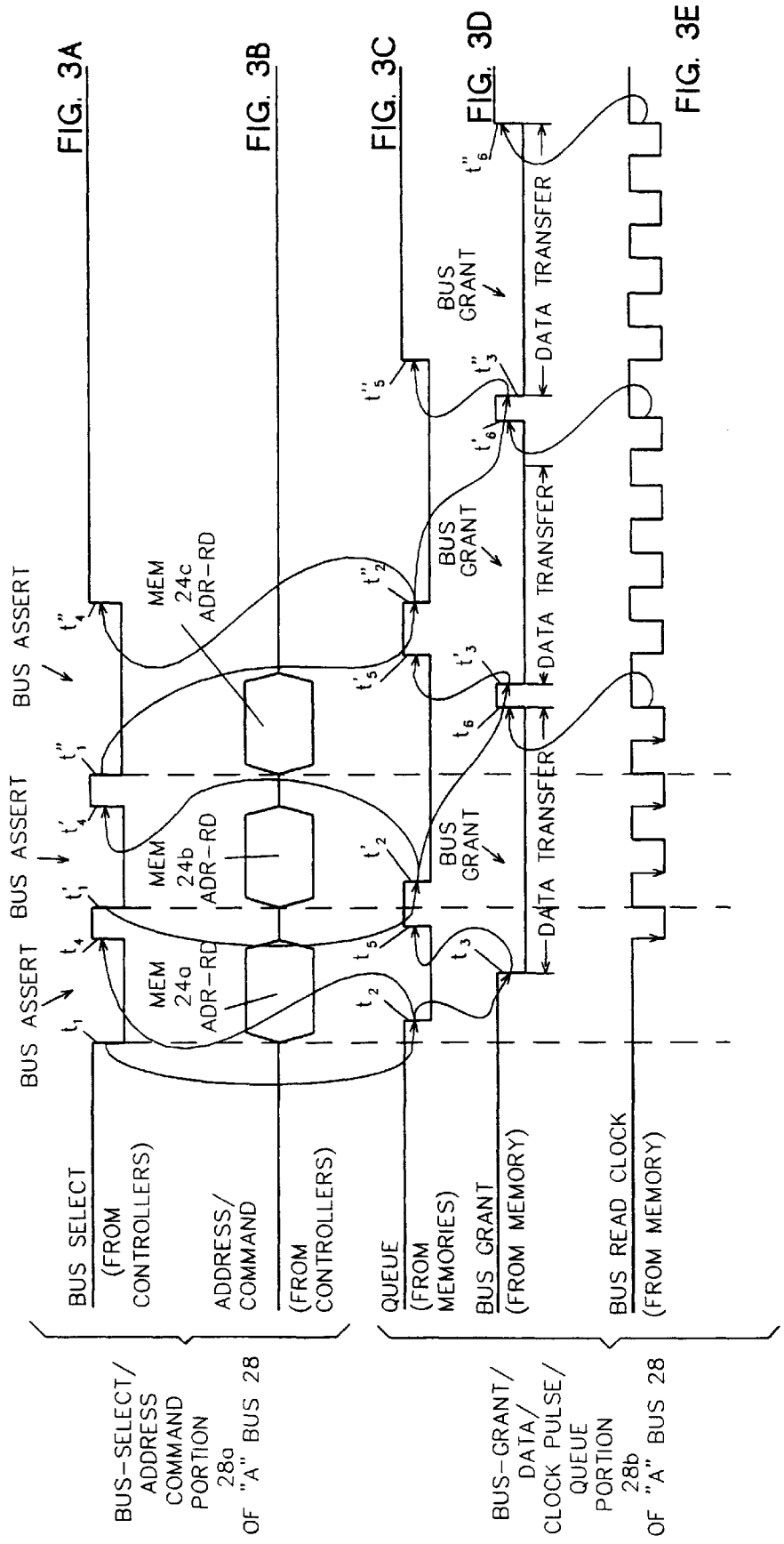

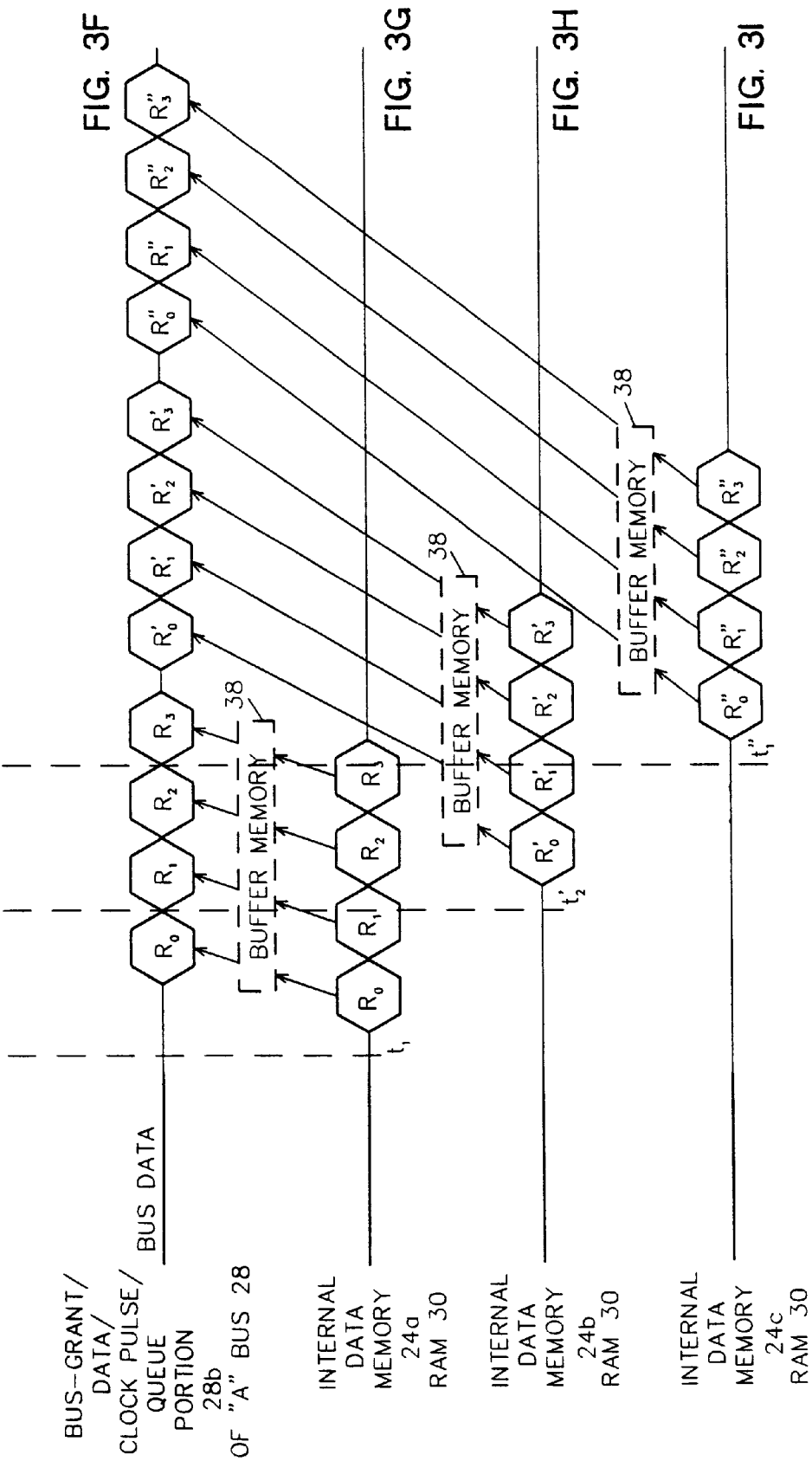

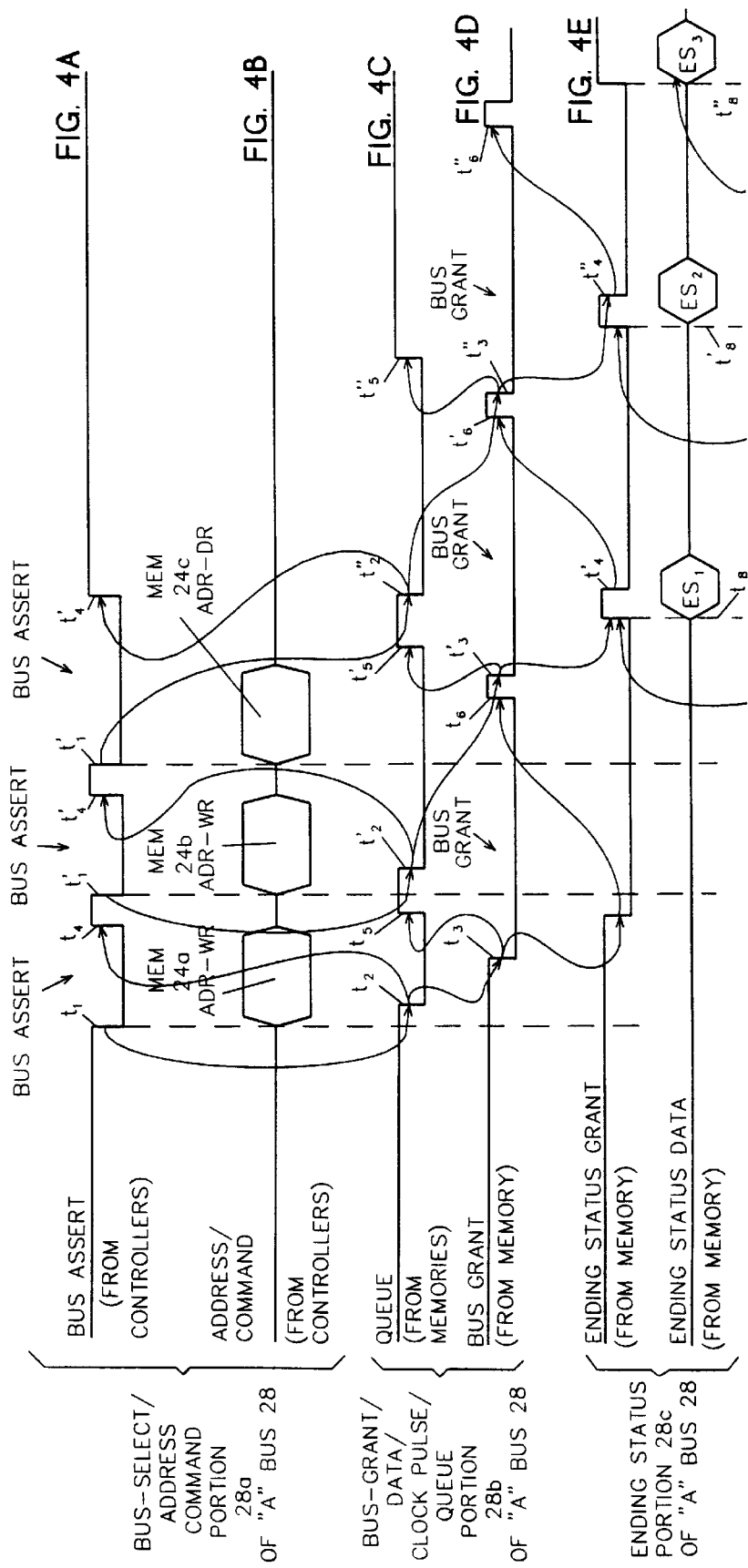

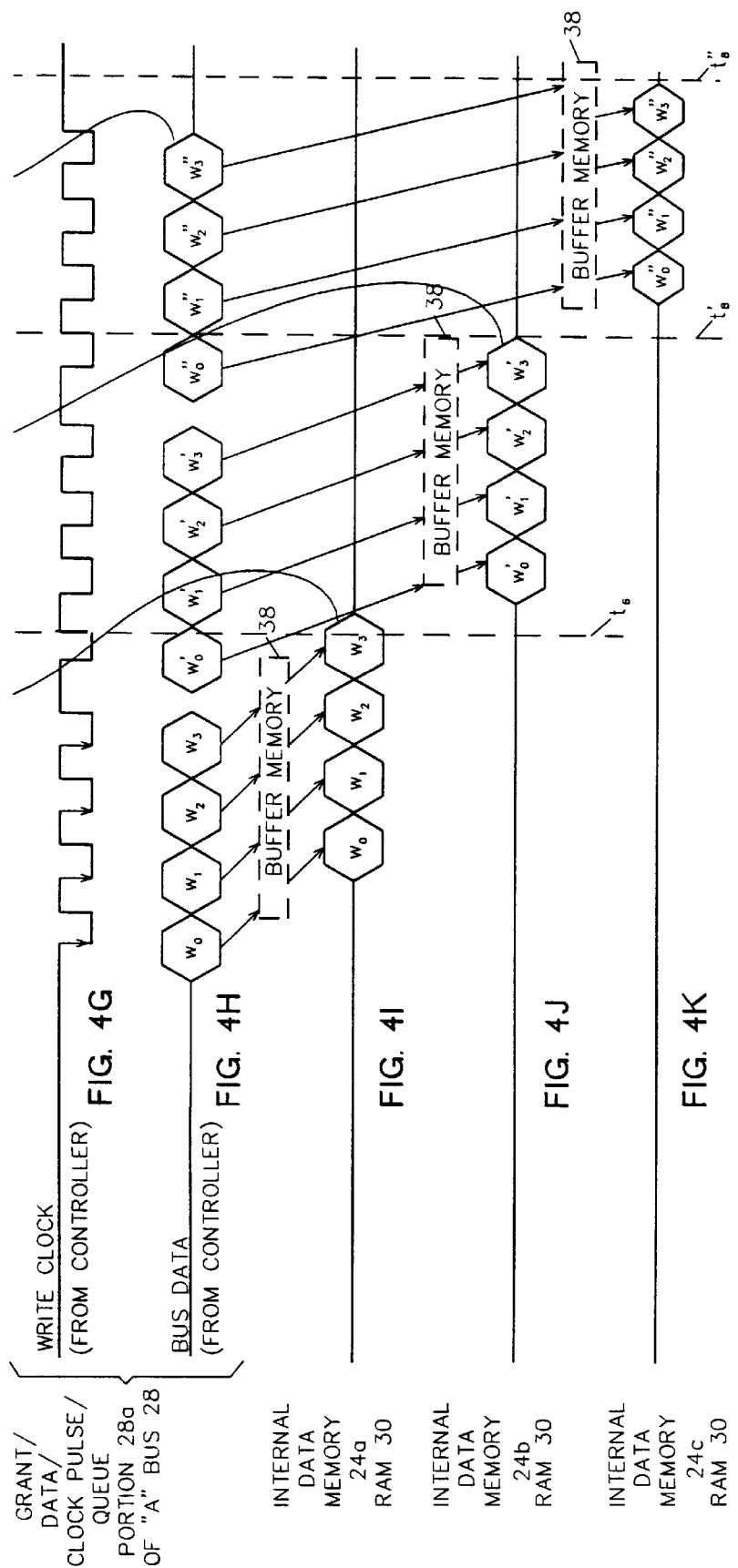

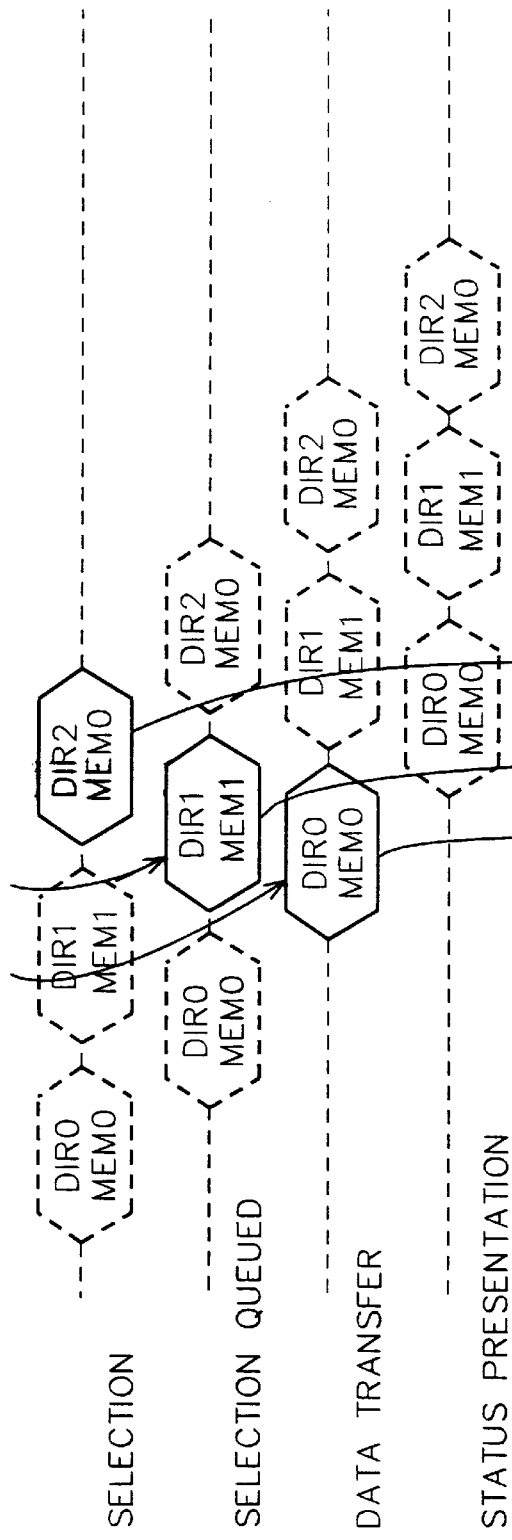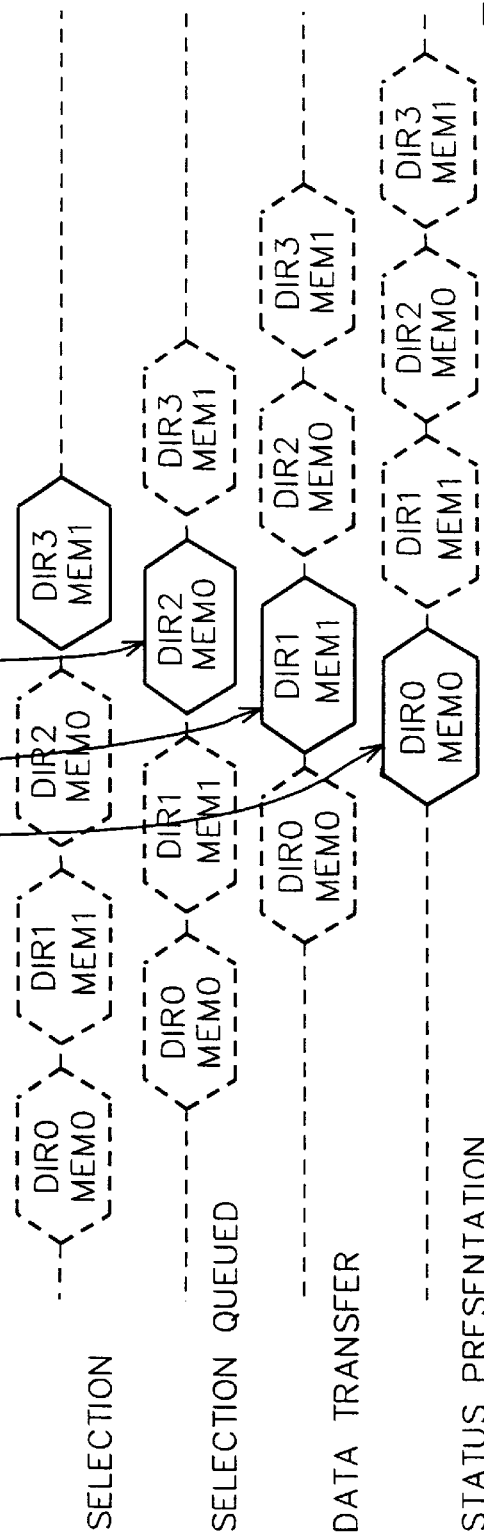

TIMING PROTOCOL FOR A DATA STORAGE SYSTEM

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large mainframe computer systems require large capacity data storage systems. These large main frame computer systems generally includes data processors which perform many operations on data introduced to the computer system through peripherals including the data storage system. The results of these operations are output to peripherals, including the storage system.

One type of data storage system is a magnetic disk storage system. Here a bank of disk drives and the main frame computer system are coupled together through an interface. The interface includes CPU, or "front end", controllers and "back end" disk controllers. The interface operates the controllers in such a way that they are transparent to the computer. That is, data is stored in, and retrieved from, the bank of disk drives in such a way that the mainframe computer system merely thinks it is operating with one mainframe memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the interface may also include, in addition to the CPU controllers and disk controllers, addressable cache memories. The cache memory is a semiconductor memory and is provided to rapidly store data from the main frame computer system before storage in the disk drives, and, on the other hand, store data from the disk drives prior to being sent to the main frame computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of buses. One set of the disk controllers is connected to one bus and another set of the disk controllers is connected to the other bus. Likewise, one set of the CPU controllers is connected to one bus and another set of the CPU controllers is connected to the other bus. The cache memories are connected to both buses. Thus, the use of two buses provides a degree of redundancy to protect against a total system failure in the event that the controllers, or disk drives connected to one bus fail.

In one system, the communication to the controllers and the cache memories is through a pair of bi-directional lines. Typically one bi-directional line is for data and the other bi-directional line is for control signals. As noted above, each controller is connected to only one of the buses and, therefore, only one pair of bi-directional lines are electrically connected to the controllers; however, because each one of the cache memories is connected to both buses, each cache memory has two pairs of bidirectional lines.

One such data storage system is an asynchronous system. In such system, when a controller wishes to read data from an addressed memory, the addressed memory places the data and a clock pulse on the bus. The data and the clock travel along the bus to the controller, the controller receives the data and clocks the data into the controller using the clock placed on the bus by the addressed memory. When the controller wishes to have data written into an addressed memory, the controller places the data on the bus and the addressed memory must strobe the data on the bus into itself. However, because the system is asynchronous, the addressed memory may not be ready to accept the data on the bus. Therefore, when addressed by the controller, the memory places a clock on the bus, the clock runs to the controller, the controller detects the clock sent by the addressed memory and places the data on the bus. The data runs back to the addressed memory, and then, after a predetermined round-trip time, the addressed memory clocks in the data. While the round-trip is a function of the distance between the controller and the addressed memory, system is designed with the a predetermined round-trip time sufficient to account for the maximum expected roundtrip time. Thus, in those cases where the controller and addressed memory pair are relative close together, time is lost in waiting for the maximum predetermined round-trip time before the addressed memory writes in the data on the bus.

Another asynchronous data storage system is described in co-pending patent application Ser. No. 08/701,862, filed Aug. 23, 1996, inventors John K. Walton, et al. entitled TIMING PROTOCOL FOR A DATA STORAGE SYSTEM, assigned to the same assignee as the present invention, the entire subject matter thereof being incorporated herein by reference. Such system includes a main frame computer section having main frame processors for processing data is coupled to a bank of disk drives through an interface. The interface includes a bus having: an bus-select/address/command portion; and a bus-grant/data/clock-pulse portion. Each one of the controllers is adapted to assert on the bus-select/command/address portion of the bus a command during a controller initiated bus select assert interval. The command includes: (i) a read operation request or a write operation request; and (ii) an address to address one of the addressable memories selected by the controller to respond to the read operation request or write operation request. In response to the command, the memories decode the address. The addressed memory, having a common random access memory (RAM) shared by the pair of buses, proceeds with any necessary bus arbitration. Once this decode and internal memory bus arbitration is performed, the RAM in the memory is addressed in a row address select/column address select (RAS/CAS) manner. After this decode/arbitration/RAS/CAS interval (i.e., latent system delay) is completed, the memory asserts the bus-grant/data/clock pulse portion of the bus and the controller, in response to the memory assert, de-asserts the bus select to thereby enable another controller to assert the bus. In order to provide some suppression of the address decode/bus arbitration/RAS/CAS latent system delay), a pre-fetch operation is provided. More particularly, each one of the memories includes the RAM, which is accessible to both buses; an internal clock; a pair of buffer memories, each one coupled to a corresponding one of the buses; and a pair of control logic networks each one coupled to a corresponding one of the pair of buses. Each control logic network is configured to enable data on the bus to commence being written into the buffer memory in response to initiation of the bus select interval and to enable the data written into the buffer memory to be read therefrom and transferred to the bus during the data transfer, bus grant interval. The data is written into, and read from, the buffer memory in response to clock pulses produced by the internal clock. With this arrangement, data may be transferred between a bus and the RAM of one addressed memory while data is being transferred from between a RAM of a second addressed memory and the buffer memory thereof for subsequent transfer to the bus. This pre-fetch operation reduces the latent system delay described above.

SUMMARY OF THE INVENTION

In accordance with the invention, a data storage system is provided wherein a main frame computer section having main frame processors for processing data is coupled to a bank of disk drives through an interface. The interface includes a bus having: an bus-select/address/command portion; and a bus-grant/data/clock-pulse/queue portion. A plurality of addressable memories is coupled to the bus. Each one of the memories includes a random access memory (RAM); internal clock; a buffer memory; and a control logic network. A plurality of controllers is coupled to the bus. Each one of the controllers is adapted to assert on the bus-select/command/address portion of the bus a command during a controller initiated bus select assert interval. The command includes: (i) a read operation request or a write operation request; and (ii) an address to address one of the addressable memories selected by the controller to respond to the read operation request or write operation request. The addressed memory is adapted to produce on the bus-grant/data/clock-pulse/queue portion of the bus a bus grant signal after the controller initiation of the bus select assert interval. The bus grant signal initiates a data transfer interval during which data is transferred between the bus and the addressed memory. During the data transfer, with a write operation the controller places the data to be written into the memory on the bus-grant/data/clock-pulse/queue portion of the bus along with associated clock pulses. In response to a read operation, the addressed memory is adapted to provide on the bus-grant/data/clock-pulse/queue portion of the bus during the data transfer interval: data at the address provided by the controller during the bus assert interval; and bus read clock pulses. The addressed memory is adapted to produce a queue assert signal on the bus-grant/data/clock-pulse/queue portion of the bus after a controller initiated bus select assert interval. This queue assert signal is produced by the addressed memory on the bus-grant/data/clock-pulse/queue portion of the bus after a bus select interval has been initiated by a controller. The queue assert signal acknowledges to the requesting controller that the memory has received the command. In response to the queue assert signal, the controller de-assets the bus-select assert interval thereby enabling another one of the controllers to assert the bus-select/address/command portion of the bus.

With such an arrangement, because each bus select assert is de-asserted by the controller in response to a memory generated queue assert (which is independent of a bus grant assert), a third one of the controllers may address, and provide a command to, a third one of the memories prior to completion of the bus grant interval of a first and second addressed one of the memories thereby further reducing latent system delay.

In accordance with another feature of the invention, a data storage system is provided wherein a main frame computer section having main frame processors for processing data is coupled to a bank of disk drives through an interface. The interface includes a bus having an bus-select/address/command portion; a bus-grant/data/clock-pulse portion; and, a bus-ending status portion. A plurality of addressable memories is coupled to the bus. A plurality of controllers is also coupled to the bus. Each one of the controllers is adapted to assert on the bus-select/command/address portion of the bus, during a controller initiated bus assert interval, a command. The command includes: (i) a write operation request; and (ii) an address to address one of the addressable memories selected by the controller to respond to the write operation. The addressed memory is adapted to produce on the bus-grant/data/clock-pulse portion of the bus, a bus grant signal to initiate the bus grant interval when the addressed memory is available to respond to the write operation request. The addressed memory, in response to the write operation request by the controller during the bus grant interval, is adapted to write therein the data on the bus-grant/data/clock-pulse portion of the bus in response to the bus write clock pulses produced by the controller on the bus-grant/data/clock-pulse portion of the bus. The memory is adapted to remove the bus grant signal from the bus-grant/data/clock-pulse portion of the bus upon completion of the write operation requested by the controller thereby terminating the bus grant interval and to produce an ending-status signal and ending-status data on the ending-status bus upon completion of the write operation requested by the controller. The ending-status data provides to the controller an indication of the success of the transfer of the data into the memory by, inter alia, error detection and correction processing, parity checking and time-out circuitry, as described in the above referenced co-pending patent application.

With such an arrangement, by having a separate bus-ending-status portion, ending-status data may be sent to the controller during a bus grant interval asserted by another one of the memories.

BRIEF DESCRIPTION OF THE DRAWING

Referring now to the accompanying drawings:

FIGS. 3A through 3I are timing diagrams useful in understanding the operation of the read operation of the data storage system of FIG. 2;

FIGS. 4A through 4K are timing diagrams useful in understanding the write operation of the data storage system interface of FIG. 2; and FIGS. 5–8 show a sequence of four phases of the timing protocol used by the system of FIG. 1.

DESCRIPTION OF THE PREFERRED EMBODIMENTS

Figures 1, 1A:
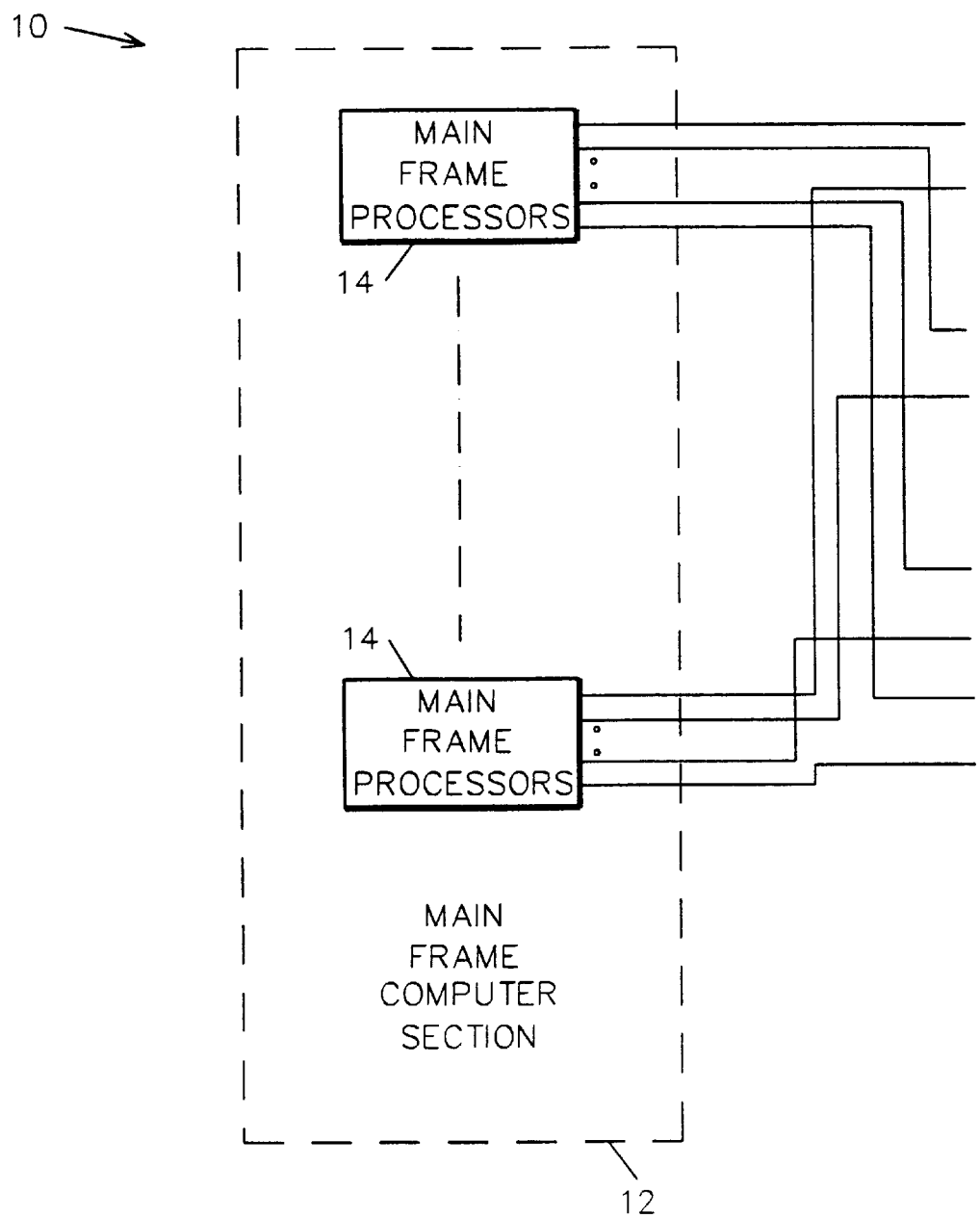
FIG. 1 is a block diagram of a computer system using a data storage system in accordance with the invention.
Figure 1B:
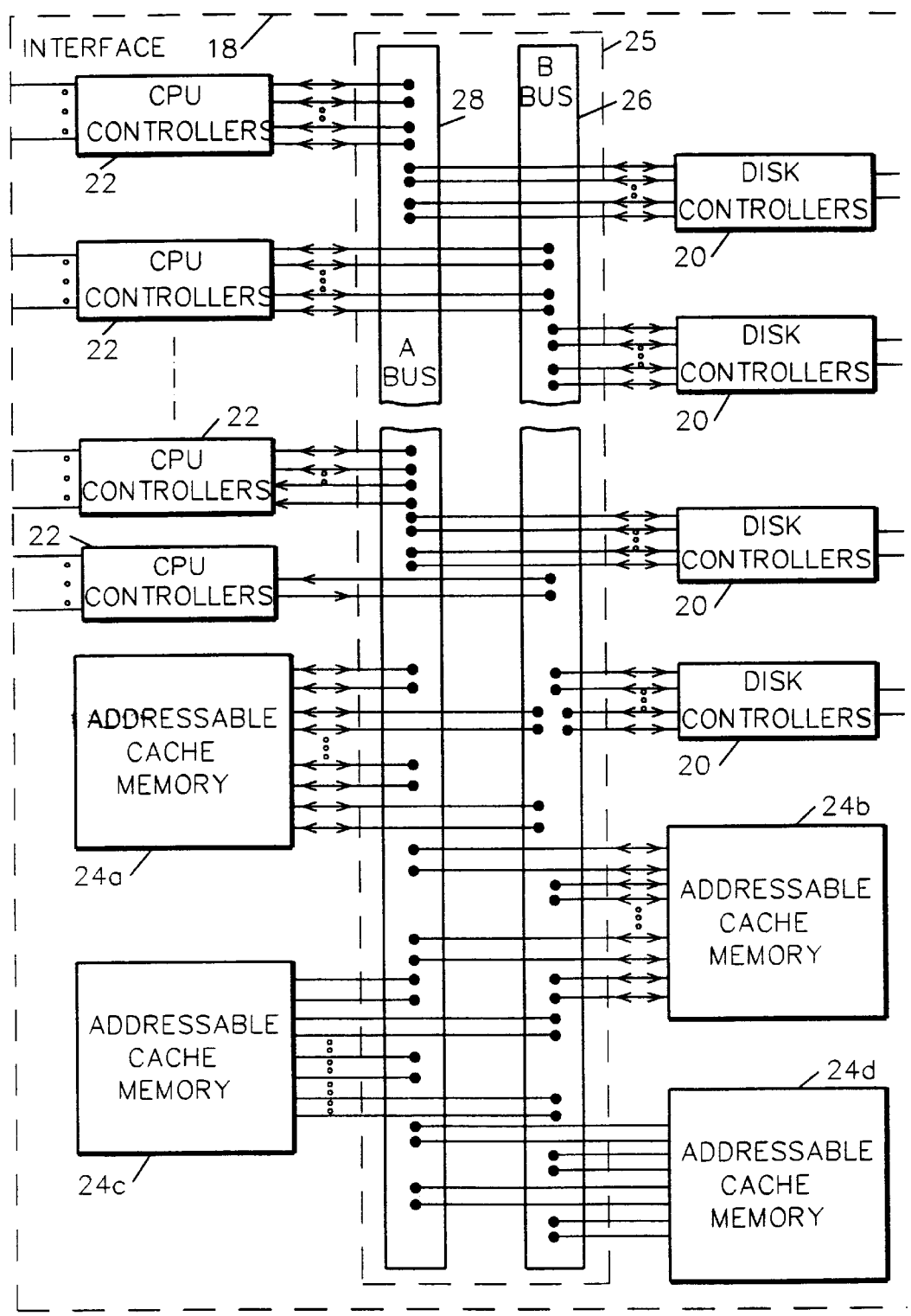
Figure 1C:
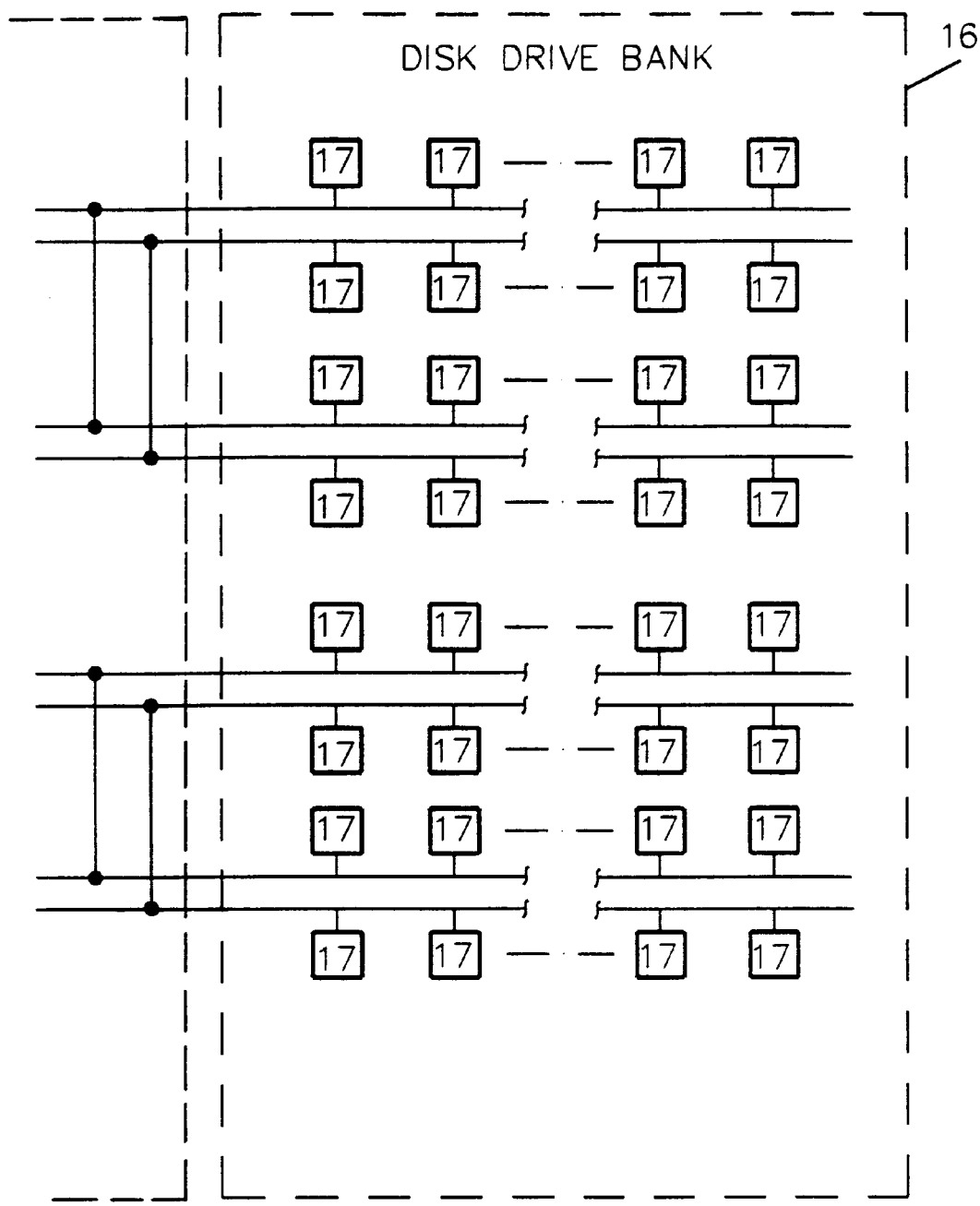

Referring now to FIG. 1, a computer system 10 is shown. The computer system 10 includes a main frame computer section 12 having main frame processors 14 for processing data. Portions of the processed data are stored in, and retrieved data from, a bank 16 of disk drives 17 through an interface 18.

The interface 18 includes disk controllers 20, central processor unit (CPU) controllers 22 and addressable cache memories 24a, 24b, 24c and 24d electrically interconnected through a bus 25, here a pair buses; i.e., an A bus 28 and a B bus 26. The cache memories 24a, 24b, 24c and 24d are hereinafter sometimes referred to only as addressable memories.

More particularly, in order to provide data integrity in case of a failure in a disk controller 20 or CPU controller 22, the pair of buses 26, 28 is provided. One portion of the disk controllers 20 is connected to one of the buses 26, 28 and the other portion of the disk controllers 20 is connected to the other one of the buses 26, 28. Likewise, one portion of the CPU controllers 22 is connected to one of the buses 26, 28 and the other portion of the CPU controllers 22 is connected to the other one of the buses 26, 28. The cache memories 24a, 24b are connected to both buses 26, 28, as shown.

Figure 2:
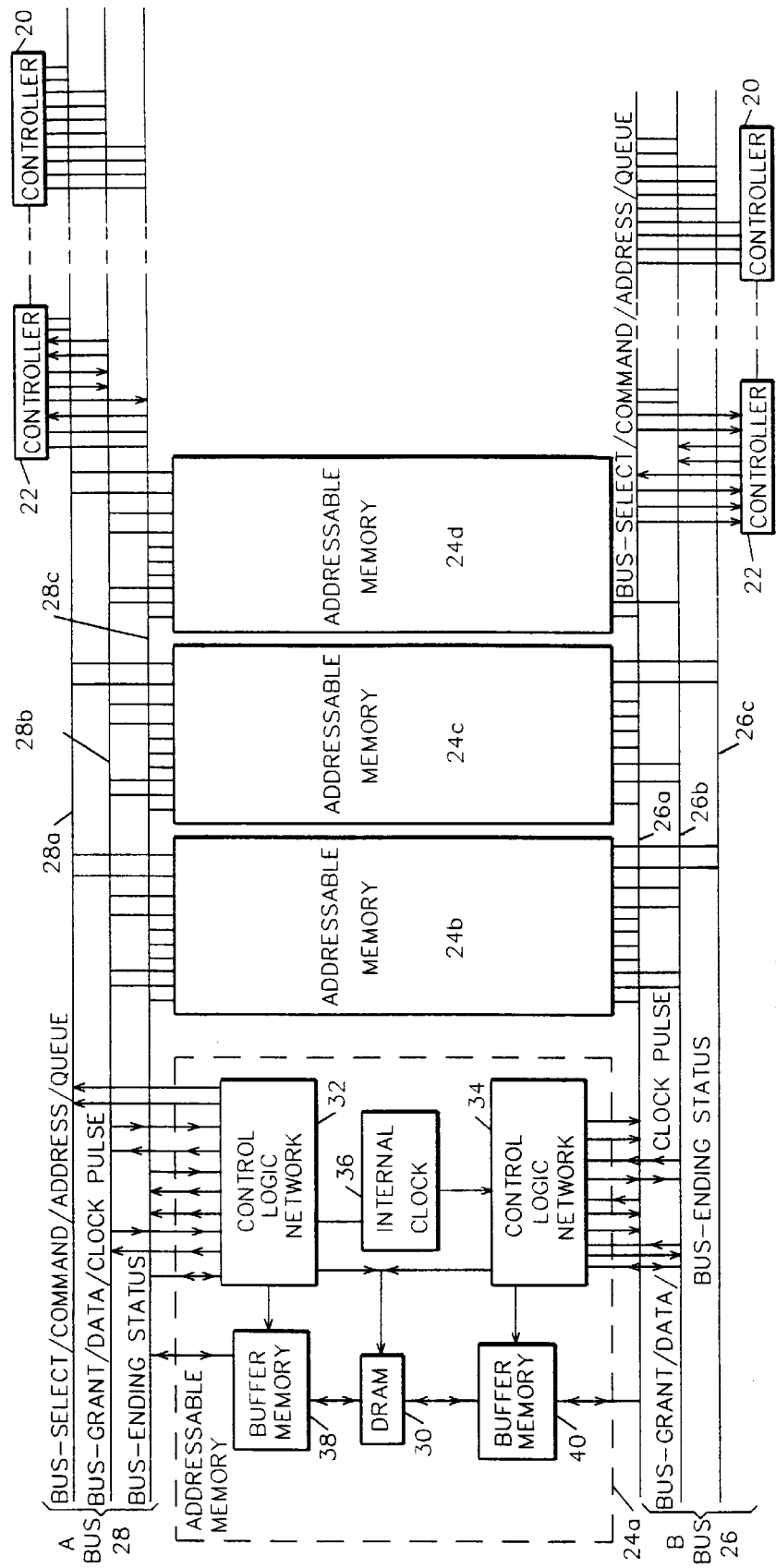
FIG. 2 is a block diagram of an interface used in the data storage system of FIG. 1, such interface providing coupling between main frame computer processors and a bank of disk storage devices according to the invention.

Referring now to FIG. 2, each one of the addressable cache memories 24a, 24b, 24c and 24d is identical in construction, but have different addresses, an exemplary one thereof, here memory 24a being shown in detail. Thus, each one of the addressable memories 24a, 24b, 24c and 24d includes: a random access memory (RAM) 30, here a dynamic random access memory (DRAM) adapted for coupling to bus 26 or bus 28 in response to row address select (RAS), column address select (CAS) write enable (W) and read enable (R) signals fed thereto; a pair of control logic networks 32, 34; internal clock 36; and a pair of buffer memories 38, 40, all arranged as shown. It is first noted that while the DRAM 30 is common to both buses 26, 28, control logic network 32 and buffer memory 38 are associated with bus 28 and control logic network 34 and buffer memory 40 are associated with bus 26. A token arbitration system, not shown, is provided for controlling sharing of the pair of buses 26, 28 by the common DRAM 30. One such bus arbitration system is described in co-pending patent application Ser. No. 08/534,376, "Bus Arbitration System, inventor Eli Leshem, filed Sep. 28, 1995, assigned to the same assignee as the present invention, the contents thereof being incorporated herein by reference. Another bus arbitration system is described in a co-pending patent application entitled "BUS ARBITRATION SYSTEM", inventors John K. Walton and Christopher S. MacLellan, filed on the same day as this patent application, assigned to the same assignee as the present invention, the contents thereof being incorporated herein by reference.

Each one of the buffer memories 38, 40 includes a write first-in/first-out memory (FIFO) and a read FIFO, not shown. The write FIFO of buffer memory 38 is adapted to have data written therein from the bus 28 in response to a write clock produced by the control logic network 32; such write clock being produced by network 32 in response to a bus write clock produced by a controller 20, 22 on the bus 28 in a manner to be described in connection with FIGS. 3A–3I and FIGS. 4A–4K. Data stored in the DRAM 30 is supplied to bus 28 either indirectly through the read FIFO of the buffer memory 38, or directly via a by-pass, not shown. In like manner, the write FIFO of buffer memory 40 is adapted to have data written therein from the bus 26 in response to a write clock produced by the control logic network 34; such write clock being produced by network 34 in response to a bus write clock produced by a controller 20, 22 on the bus 26 in a manner equivalent to that to be described in connection with FIGS. 3A–3I and 4A–4K. Data stored in the DRAM 30 is supplied to bus 26 either indirectly through the read FIFO of the buffer memory 40, or directly via a bypass, not shown. It is noted that, while the internal transfer of data among the buffer memory 40, DRAM 30 and bus 26 is controlled by control logic network 34, both control logic networks 32, 34 are synchronized with respect to each other by the internal clock 36.

More particularly, the basic read/write bus protocol for a read operation will be described with reference to FIGS. 3A–3I and FIGS. 4A–4K, respectively, it being understood the read/write protocol for A Bus 28 is the same as the bus protocol for B bus 26. Bus arbitration for the shared DRAM 30 is performed by the bus arbitration system described in the above referenced patent application Ser. No. 08/534,376. Thus, considering A bus 28, and recognizing that B bus 26 operates in the equivalent manner, it is first noted that bus 28, like bus 26, has an bus-select/address/command portion 28a, a bus-grant/data/clock-pulse/queue portion 28b, and an ending-status portion 28c, as shown in FIG. 2. Each one of the controllers 20, 22 is adapted: (a) to assert on the bus-select/command/address portion 28a of the bus 28 during a controller initiated bus assert interval ("BUS ASSERT", FIG. 3A), a command on bus portion 28a (FIGS. 3B and 4B)), such command including: (i) either a write operation request (FIG. 4B) or a read operation request (FIG. 3B); and (ii) an address for the one of the addressable memories 24a, 24b, 24c and 24d selected by the controller 20, 22 to respond to the read operation (FIG. 3B) or write operation command (FIG. 4B); and (b) to produce data (FIG. 4H) and bus write clock pulses (FIG. 4G) on the bus-grant/data/clock-pulse portion 28b of the bus 28 when a write operation is requested during a bus grant ("BUS GRANT") interval (FIG. 4D) produced by the addressed one of the memories 24a, 24b.

Each addressed one of the addressable cache memories 24a, 24b, 24c and 24d is adapted: (a) to produce on the bus-grant/data/clock-pulse portion 28b of the bus 28, a bus grant ("BUS GRANT") signal (FIGS. 3D and 4D) to initiate the bus grant interval when the addressed one of the memories 24a, 24b is available to respond to the read (FIG. 3D) or write (FIG. 4D) operation request by the controller 20, 22; (b) to provide on the bus-grant/data/clock-pulse portion 28b of the bus 28 during the bus grant interval in response to the read operation request by the controller 20, 22: (i) data at the address provided by the controller 20, 22 during the bus assert interval (FIGS. 3A and 4A); and (ii) bus read clock pulses (FIG. 3E); (c) to write, in response to the write operation request by the controller 20, 22 during the bus grant interval, the data on the bus-grant/data/clock-pulse portion 28b of the bus 28 (FIG. 4H) into the addressed one of the memories 24a, 24b in response to the bus write clock pulses (FIG. 4G) produced by the controller 20, 22 on the bus-grant/data/clock-pulse portion 28b of the bus 28; (d) to produce a queue signal on the bus-grant/data/clock pulse/queue portion 28b of the bus 28 (FIGS. 3C and 4C) and to remove the bus grant signal (FIG. 3D) from the bus-grant/data/clock-pulse/queue portion 28b of the bus 28 upon completion of the read or write operation requested by the controller 20, 22 terminating the bus grant interval (FIG. 3D); and to produce an ending-status signal and data on the ending-status portion 28c of the bus 28 upon completion of the write operation requested by the controller 20, 22 (FIGS. 4E and 4F). Each one of the controllers 20, 22 is adapted to provide on the bus-select/address/command portion 28a of the bus 28 another address and command after termination of a queue signal. Thus, it is noted that while a BUS GRANT assertion by a memory initiates a data transfer interval (during which data and clock pulses are placed on the bus 28 by an addressed memory after a read operation request by a controller 20, 22 or during which data and clock pulses placed on the bus 28 by the controller 20, 22 after a write operation request by the controller 20, 22 and are written into the addressed memory), it is the controller's detection of the queue assert signal that de-asserts the BUS ASSERT independent of whether the BUS GRANT, data transfer interval has been initiated.

The control logic networks 32, 34 are configured to enable data on the bus 28, 26, respectively, to be written into the random access memory (RAM) 30 of one of the addressed one of the memories 24a, 24b, 24c and 24d in response to clock pulses produced on the bus 28, 26, respectively during a period of time when data stored in the random access memory (RAM) 30 of another one of the addressable memories 24a, 24b, 24c and 24d is transferred to the buffer memory 38, 40, respectively, thereof in response to clock signals produced by the internal clock 36 thereof as described in the above-referenced co-pending patent application Ser. No. 08/701,862. With this arrangement, data to be read from the other one of the addressable memories (here, in this example, memory 24b) can be pre-fetched from the random access memory (RAM) 30 thereof while data is written into the first-mentioned addressable memory (here, memory 24a).

Referring now to FIGS. 3A through 3I, and considering bus 28, at time $t_1$ a first one of the controllers 20, 22 asserts the bus 28 by changing the level of the signal on the bus-select/address/command portion 28a of the bus 28 from a "high" to a "low", FIG. 3A. (It should be noted that here, to assert a bus 26, 28, a signal goes from a "high" level to a "low" level and to de-assert a bus a level goes from a "low" level to a "high" level). Next, one of the addressable memories 24a, 24b, here memory 24a is addressed, and, here, a read command is requested by the first one of the controllers 20, 22 on the bus-select/address/command portion 28a of the bus 28, as indicated in FIG. 3B. At time $t_1$, the memory 24a begins to decode its address and begins to resolve any internal bus arbitration. Once the internal bus arbitration is resolved, a RAS/CAS phase can begin. A queue assert signal is produced on the bus-grant/data/clock pulse/queue portion 28a of bus 28 (FIG. 3D) at time $t_2$ indicating that to the controller 20, 22 the memory 24a has properly responded to the address and is preparing to have data in the RAM 30 thereof read therefrom and written into the buffer memory 38 in response to clock pulses produced by the internal clock 36 (FIGS. 3G and 3F). Once the internal bus arbitration is completed, the data in the RAM 30 of addressed memory 24a is read therefrom and written into the buffer memory 30 in response to clock pulses produced by the internal clock 36 (FIGS. 3G and 3F). Once the memory 24a is ready to transfer the data in the buffer memory 38 to the bus 28, memory 24a produces a bus grant (i.e., bus assert) signal on the bus-grant/data/clock pulse/queue portion 28b of bus 28 (FIG. 3D) along with clock pulses (FIG. 3E) at time $t_3$. In response to the bus grant signal at time $t_3$, the queue signal is de-asserted by the memory 24a. In response to this queue assert signal at time $t_2$, the controller 20, 22 de-assets the bus select at time $t_4$ (FIG. 3A). Thus, a second controller 20, 22 is now allowed to assert the bus select, as shown at time $t'_1$ in FIG. 3A. As noted above, once the memory 24a has asserted the queue signal at time $t_2$, the memory 24a is able to assert a bus grant signal at time $t_3$ initiating a BUS GRANT interval during which data ($R_0$–$R_3$) may be read from the addressed memory 24a (i.e., more particularly read from buffer memory 38) and placed on the bus-grant/data/clock pulse/queue portion 28a of bus 28, as shown in FIG. 3F, along with clock pulses (FIG. 3E). After asserting BUS GRANT at time $t_3$, the queue signal is de-asserted by the memory 24 at time $t_5$ (FIG. 3C). Further, as noted above, during the BUS GRANT, i.e., beginning at time $t_3$ (FIG. 3D), the data in buffer memory 38 is read therefrom and transferred to the bus portion 28b along with clock pulses (FIGS. 3F and 3E, respectively. After the last clock pulse is transmitted at time $t_6$, the addressed memory de-asserts BUS GRANT and the data transfer interval is terminated at time $t_6$, FIGS. 3E and 3D.

It is noted that during this first BUS GRANT interval (i.e, during the time interval between time $t_3$ and $t_6$), a second controller 20, 22 has asserted the bus at time addressed a second one of the memories, here memory 24b, and provided commands, as indicated in FIGS. 3A and 3B. The process repeats at times $t'_2$–$t'_6$, in like manner to that at times $t_2$–$t_6$. It is noted that an internal data transfer occurs in memory 24b for read data $R'_0$–$R'_3$ concurrently with the internal transfer occurring in memory 24a. It is also noted that the queue signal at time $t'_2$ de-asserted the bus select (FIG. 3A) to enable a third one of the controllers 20, 22 to address a third one of the memories, here memory 24c at time $t''_1$. The process repeats at times $t''_2$–$t''_6$ as indicated for read data $R''_0$–$R''_3$. Thus, as indicated, internal data transfer occurs in memory 24c concurrently with the internal transfers occurring in memories 24a and 24b.

With such an arrangement, because each bus assert is de-asserted by the controller in response to a memory generated queue assert (which is independent of a bus grant assert), a third one of the controllers may address, and provide a command to, a third one of the memories prior to completion of the bus grant interval of a first and second addressed one of the memories thereby further reducing latent system delay.

Considering now write commands, and referring to FIGS. 4A–4K, and considering bus 28, at time $t_1$ a first one of the controllers 20, 22 asserts the bus 28 by changing the level of the signal on the bus-select/address/command portion 28a of the bus 28 from a "high" to a "low", FIG. 4A. Next, one of the addressable memories 24a, 24b, here memory 24a is addressed, and, here, a write command is requested by the first one of the controllers 20, 22 on the bus-select/address/command portion 28a of the bus 28, as indicated in FIG. 4B. At time $t_1$, the memory 24a begins to decode its address. A queue asserts signal is produced on the bus-grant/data/clock pulse/queue portion 28a of bus 28 (FIG. 4D) at time $t_2$ indicating that to the controller 20, 22 that the memory 24a has properly responded to the address. Once the memory 24a is ready to transfer the data on bus 28 to buffer memory 38, the memory 24a produces a bus grant (i.e., bus assert) signal on the bus-grant/data/clock pulse/queue portion 28b of bus 28 (FIG. 4D) at time $t_3$. In response to the bus grant assert signal, the queue signal is de-asserted by the controller 20, 22 at time $t_3$. In response to this queue signal, the controller 20, 22 de-assets the bus select at time $t_4$ (FIG. 4A). Thus, a second controller 20, 22 is now allowed to assert the bus select, as shown at time $t'_1$ in FIG. 4A. It is also noted that, after the memory 24a has asserted the queue signal at time $t_2$, the memory 24a asserts a bus grant signal at time $t_3$ initiating a BUS GRANT interval during which data ($W_0$–$W_3$) may be written from the bus 28 in response to clock pulses produced on bus 28 by controller 20, 22 (FIG. 4G). After asserting BUS GRANT at time $t_3$, the queue signal is de-asserted by the memory 24a at time $t_5$ (FIG. 4C). Further, after the memory has asserted a bus grant, after the data transfer between bus 28 and the addressed memory 24a has commenced at time $t_3$, the addressed memory 24a asserts ending-status signal on the ending-status portion 28c of bus 28 (FIG. 4E) at time $t_7$. During the BUS GRANT, i.e., beginning at time $t_3$ (FIG. 4D), the data in on bus 28 is written into buffer memory 38 and transferred to the RAM 30 (FIGS. 4H and 4I) by time $t_8$. (Internal bus arbitration begins at time $t_3$ and is completed by time $t_8$). After the last clock pulse is transmitted, at time $t_6$, the BUS GRANT interval is terminated (FIG. 4D). After the data is transferred from the buffer memory 38 to RAM 30, the ending-status bus portion 28c is de-asserted by the memory 24a at time $t_8$ and such memory 24a sends status data to the controller 20, 22 via the ending-status portion of the bus portion 28c (FIGS. 4E and 4F). This ending-status data indicates to the controller 20, 22 issuing the address and command the results of error detection and correction processing, parity checking and time-out circuitry in the addressed memory 24a, not shown, as described in the above. It should also be noted that the bus grant cannot be de-asserted by the addressed memory 24a unless the addressed memory issued a bus grant assert, and an ending-status assert and the controller produced write clock pulses have terminated.

It is noted that during this first BUS GRANT interval (i.e, during the time interval between time $t_3$ and $t_6$), a second controller 20, 22 has asserted the bus at time $t'_1$, addressed a second one of the memories, here memory 24b, and provided commands, as indicated in FIGS. 4A and 4B. The process repeats at times $t'_2-t'_{81}$ in like manner to that at times $t_2-t_8$. It is noted that an internal data transfer occurs in memory 24b for write data $W'_0-W'_3$ concurrently with the internal transfer occurring in memory 24a (FIG. 4J). It is also noted that the queue signal at time $t'_2$ de-asserted the bus select (FIG. 4A) to enable a third one of the controllers 20, 22 to address a third one of the memories, here memory 24c at time $t''_1$. The process repeats at times $t''_2-t''_8$ as indicted for write data $W''_0-W''_3$ (FIG. 4K). Thus, as indicated, internal data transfer occurs in memory 24c concurrently with the internal transfers occurring in memories 24a and 24b.

With such an arrangement, by having a separate bus-ending-status portion, ending-status data may be sent to the controller during a bus grant interval asserted by another one of the memories.

Figure 5:
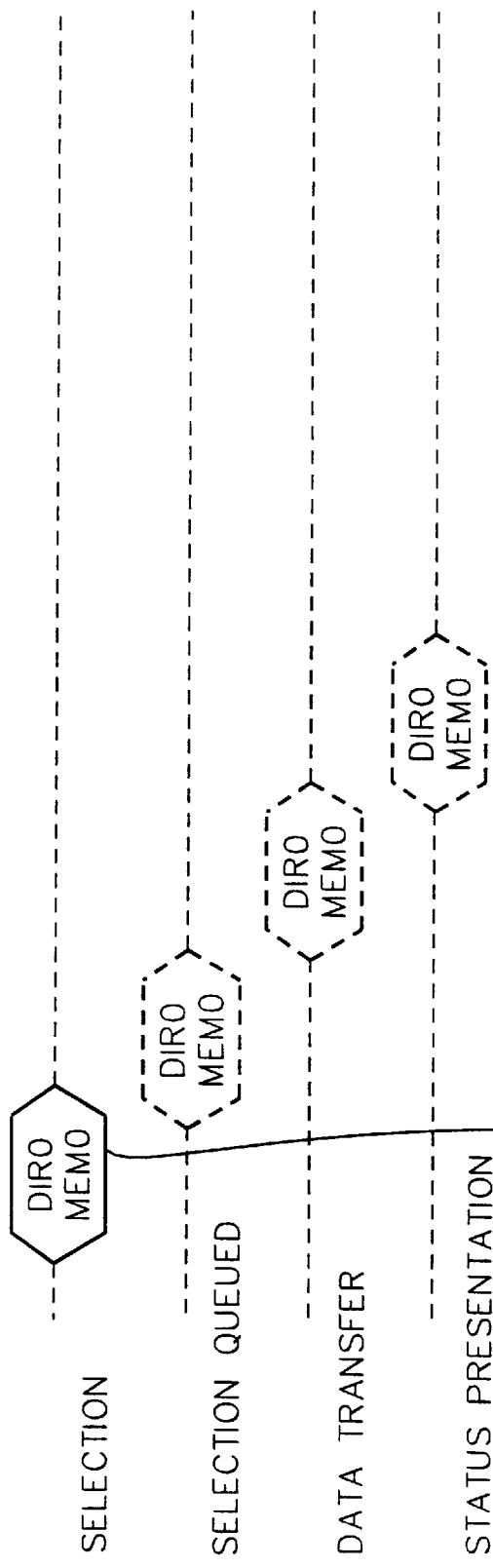
Figure 6:
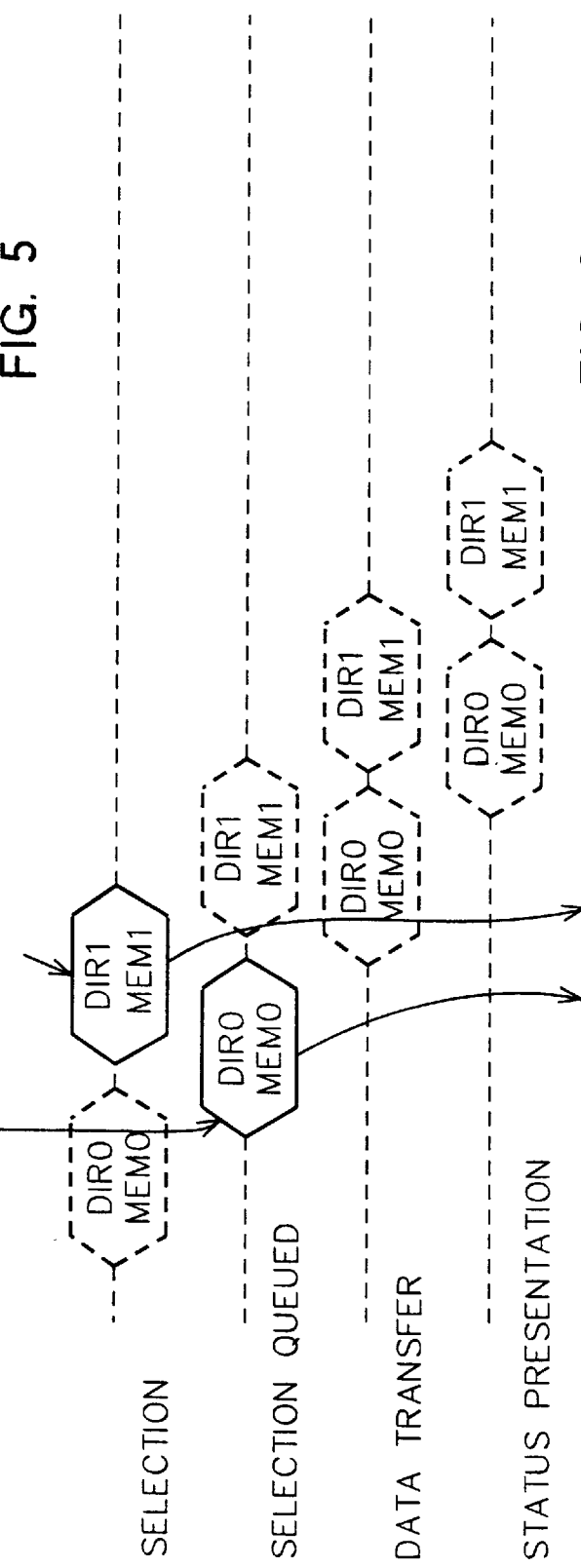

In summary then, the protocol is divided into four phases: a selection phase; a selection queued phase; a data transfer phase; and a status presentation phase. During the selection phase, one of the controllers (DIR0) 20, 22 asserts one of the buses 26, 28 after a higher level arbitration and issues a command for one of the memories 24a (MEM0) (FIG. 5); a selection queued phase which allows another controller (DIR1) to enter the selection phase for a second one of the memories 24b (MEM1) in parallel with the selected memory MEM1 preparing for the subsequent data transfer phase (FIG. 6). The selection queued phase then enters the data transfer phase (FIG. 7), allowing another selection queued phase to begin, which then allows another selection phase (i.e., DIR2 for MEM0), in parallel with the data transfer phase. The data transfer phase then enters the status presentation phase (FIG. 8) allowing another data transfer phase to execute. The protocol allows all four phases to be active concurrently, although each phase belong to a different selection (i.e., to a different controller, DIR1, DIR2 and DIR3), as indicated in FIG. 9. Signalling transitions between phases are asynchronous.

Other embodiments are within the spirit and scope of the appended claims.

What is claimed is:

1. A data storage system wherein a main frame computer section having main frame processors for processing data is coupled to a bank of disk drives through an interface, such interface comprising:

(A) a bus having: an bus-select/address/command portion; bus-grant/data/clock-pulse/queue portion;

(B) a plurality of addressable memories coupled to the bus;

(C) a plurality of controllers coupled to the bus, each one thereof being configured:

to assert on the bus-select/command/address portion of the bus during a controller initiated bus select assert interval, a command including: (i) a read operation request; and (ii) an address to address one of the addressable memories selected by the controller to respond to the read operation request; and (D) such addressed memory being configured:

(a) to produce on the queue portion of the bus a queue assert signal after a controller initiated bus select assert interval, such queue signal terminating the bus select interval;

(b) to produce on the bus-grant/data/clock-pulse portion of the bus a bus grant signal after a queue assert signal is produced on the queue portion of the bus, such bus grant signal initiating a data transfer, bus grant interval;

(c) to provide on the bus-grant/data/clock-pulse portion of the bus during the data transfer, bus grant interval: (i) data at the address provided by the controller during the bus assert interval; and (ii) bus read clock pulses; and (d) to remove the bus grant signal from the bus-grant/data/clock-pulse portion of the bus upon completion of the read operation requested by the controller to terminate the bus grant interval; and (E) wherein another one of the controllers is configured to provide on the bus-select/address/command portion of the bus another address and command after the queue signal terminates the bus select assert interval.

2. The system recited in claim 1 wherein each one of such addressable memories comprising:

(a) a random access memory;

(b) an internal clock;

(c) a buffer memory; and (d) a logic network configured to enable data on the bus to commence being written into the buffer memory in response to initiation of the bus select interval and to enable the data written into the buffer memory to be read therefrom and transferred to the bus during the data transfer, bus grant interval, such data being written into, and read from the buffer memory in response to clock pulses produced by the internal clock.

3. A data storage system wherein a main frame computer section having main frame processors for processing data is coupled to a bank of disk drives through an interface, such interface comprising:

(A) a bus having: an bus-select/address/command portion; a bus-grant/data/clock-pulse portion; and, a bus-ending-status portion;

(B) a plurality of addressable memories coupled to the bus;

(C) a plurality of controllers coupled to the bus, each one thereof being configured:

(a) to assert on the bus-select/command/address portion of the bus during a controller initiated bus assert interval a command including: (i) a write operation request; and (ii) an address to address one of the addressable memories selected by the controller to respond to the write operation; and (b) to produce data and bus write clock pulses on the bus-grant/data/clock-pulse portion of the bus when a write operation is requested during a subsequent bus grant interval produced by the addressed memory;

(D) such addressed memory being configured:

(a) to produce on the bus-grant/data/clock-pulse portion of the bus a bus grant signal to initiate the bus grant interval when the addressed memory is available to respond to the write operation request;

(b) to write, in response to the write operation request by the controller during the bus grant interval, the data on the bus-grant/data/clock-pulse portion of the bus into the addressed memory in response the bus write clock pulses produced by the controller on the bus-grant/data/clock-pulse portion of the bus;

(c) to remove the bus grant signal from the bus-grant/data/clock-pulse portion of the bus upon completion of the write operation requested by the controller terminating the bus grant interval; and (e) to produce an ending-status signal and ending-status data on the ending-status bus upon completion of the write operation requested by the controller.

4. The system recited in claim 3 wherein each one of such addressable memories comprising:

(a) a random access memory;

(b) an internal clock;

(c) a buffer memory; and (d) a logic network configured to enable data on the bus to commence being written into the buffer memory in response to initiation of the bus select interval and to enable the data written into the buffer memory to be read therefrom and transferred to the random access memory during the data transfer, bus grant interval, such data being read from the buffer memory and written into the random access memory in response to clock pulses produced by the internal clock.

5. The system recited in claim 3 wherein the bus includes a queue portion and wherein such addressed memory is configured:

(a) to produce on the queue portion of the bus a queue signal a predetermined time after a controller initiated bus select assert interval, such queue signal terminating the bus select interval;

(b) to produce on the bus-grant/data/clock-pulse portion of the bus a bus grant signal a predetermined time after a queue signal is produced on the queue portion of the bus, such bus grant signal initiating a data transfer, bus grant interval;

(c) to provide on the bus-grant/data/clock-pulse portion of the bus during the data transfer, bus grant interval: (i) data at the address provided by the controller during the bus assert interval; and (ii) bus read clock pulses; and (d) to remove the bus grant signal from the bus-grant/data/clock-pulse portion of the bus upon completion of the read operation requested by the controller to terminate the bus grant interval; and wherein another one of the controllers is configured to provide on the bus-select/address/command portion of the bus another address and command after the queue signal terminates the bus select assert interval.

6. The system recited in claim 5 wherein each one of such addressable memories comprising:

(a) a random access memory;

(b) an internal clock;

(c) a buffer memory; and (d) a logic network configured to enable data on the bus to:

commence being written into the buffer memory in response to initiation of the bus select interval and to enable the data written into the buffer memory to be read therefrom and transferred to the random access memory during the data transfer, bus grant interval, such data being read from the buffer memory and written into the random access memory in response to clock pulses produced by the internal clock and;

enable data on the bus to commence being written into the buffer memory in response to initiation of the bus select interval and to enable the data written into the buffer memory to be read therefrom and transferred to the random access memory during the data transfer, bus grant interval, such data being read from the buffer memory and written into the random access memory in response to clock pulses produced by the internal clock.

\* \* \* \* \*